United States Patent
Arnold et al.

(10) Patent No.: US 7,870,926 B2
(45) Date of Patent: Jan. 18, 2011

(54) VEHICLES INCLUDING JACK SHAFT HAVING CLUTCH AND COUPLING ENGINE AND FRONT WHEEL

(75) Inventors: David W. Arnold, Glendale, CA (US); Michael Bury, Temecula, CA (US)

(73) Assignee: Honda Motor Company, Ltd., Tokyo (JP)

( * ) Notice: Subject to any disclaimer, the term of this patent is extended or adjusted under 35 U.S.C. 154(b) by 207 days.

(21) Appl. No.: 12/120,508

(22) Filed: May 14, 2008

(65) Prior Publication Data

US 2009/0283350 A1 Nov. 19, 2009

(51) Int. Cl.
*B60K 17/342* (2006.01)
*B60K 17/34* (2006.01)

(52) U.S. Cl. ............... 180/251; 180/233; 180/241; 180/239

(58) Field of Classification Search ........... 180/251, 180/233, 241, 239
See application file for complete search history.

(56) References Cited

U.S. PATENT DOCUMENTS

| | | |
|---|---|---|
| 3,642,083 A | 2/1972 | Rodler, Jr. |
| 3,812,929 A | 5/1974 | Farque |
| 3,861,487 A | 1/1975 | Gill |
| 3,972,380 A | 8/1976 | Hudson et al. |
| 4,330,201 A | 5/1982 | Walker |
| 4,493,387 A | 1/1985 | Lake et al. |
| 4,613,318 A | 9/1986 | McWilliam et al. |
| 4,664,645 A | 5/1987 | Muck et al. |
| 4,666,015 A | 5/1987 | Matsuda et al. |
| 4,699,234 A * | 10/1987 | Shinozaki et al. .......... 180/233 |
| 4,786,075 A * | 11/1988 | Takahashi .................. 180/254 |
| 4,919,644 A | 4/1990 | Carlyle |
| 5,013,285 A | 5/1991 | Carlyle |
| 5,036,930 A | 8/1991 | Bisel et al. |
| 5,036,939 A | 8/1991 | Johnson et al. |
| 5,184,582 A | 2/1993 | Okui et al. |
| 5,769,408 A | 6/1998 | Selak et al. |
| 6,093,123 A | 7/2000 | Baddaria et al. |
| 6,193,622 B1 | 2/2001 | Cressman et al. |
| 6,343,669 B2 | 2/2002 | Davis et al. |
| 6,470,659 B2 | 10/2002 | Shimamura et al. |
| 6,488,110 B2 | 12/2002 | Price |
| 6,569,043 B2 | 5/2003 | Younggren et al. |
| 6,572,501 B2 | 6/2003 | Winklhofer |
| 6,648,355 B2 | 11/2003 | Ridenhour |
| 6,743,129 B1 | 6/2004 | Younggren et al. |
| 6,862,953 B2 * | 3/2005 | Fitzgerald et al. ......... 74/665 G |
| 7,131,650 B2 | 11/2006 | Melcher |
| 2002/0123401 A1 | 9/2002 | Henry |

* cited by examiner

*Primary Examiner*—Lesley Morris
*Assistant Examiner*—Marlon A Arce
(74) *Attorney, Agent, or Firm*—Ulmer & Berne LLP

(57) ABSTRACT

A vehicle includes a front wheel, a rear wheel, an engine, and a jack shaft. The engine is coupled with the rear wheel and the jack shaft. The jack shaft is configured to selectively couple the engine with the front wheel.

19 Claims, 5 Drawing Sheets

VEHICLES INCLUDING JACK SHAFT HAVING CLUTCH AND COUPLING ENGINE AND FRONT WHEEL

TECHNICAL FIELD

A vehicle includes a jack shaft which facilitates coupling of the vehicle's engine with one or more of the vehicle's wheels.

BACKGROUND

Many conventional all terrain vehicles ("ATVs") include four wheels which are all drivingly coupled with an engine to facilitate all-wheel drive operation of the ATV. In certain such ATVs, one-way clutches (e.g., sprag-type clutches) are provided in the hubs of the front wheels of the ATV in order to facilitate overrunning of the front wheels during certain driving conditions.

SUMMARY

In accordance with one embodiment, a vehicle comprises a frame, at least one front wheel, at least one rear wheel, an engine, a drive sprocket, a front sprocket, a rear sprocket, and a jack shaft. The frame extends from a front end to a rear end. The front wheel(s) are supported adjacent to the front end of the frame. The rear wheel(s) are supported adjacent to the rear end of the frame. The engine is attached to the frame. The drive sprocket is coupled with the engine. The front sprocket is drivingly engaged with the front wheel(s). The rear sprocket is drivingly engaged with the rear wheel(s). The jack shaft comprises a first sprocket, a second sprocket, and a one-way clutch selectively coupling the first sprocket and the second sprocket. The front sprocket is coupled with the first sprocket of the jack shaft. The drive sprocket is coupled with each of the rear sprocket and the second sprocket of the jack shaft.

In accordance with another embodiment, an all terrain vehicle comprises a frame, a front left wheel, a front right wheel, a front differential, a rear left wheel, a rear right wheel, a rear differential, an engine, a transmission, a drive sprocket, a jack shaft, a first flexible drive member, a second flexible drive member, and a third flexible drive member. The frame extends from a front end to a rear end. The front left wheel and the front right wheel are each supported adjacent to the front end of the frame. The front differential is coupled with each of the front left wheel and the front right wheel. The front differential comprises a front sprocket. The rear left wheel and the rear right wheel are each supported adjacent to the rear end of the frame. The rear differential is coupled with each of the rear left wheel and the rear right wheel. The rear differential comprises a rear sprocket. The engine is attached to the frame and the transmission is coupled with the engine. A drive sprocket is coupled with the transmission. The jack shaft comprises a first sprocket, a second sprocket, and a one-way clutch selectively coupling the first sprocket and the second sprocket. The first flexible drive member couples the front sprocket and the first sprocket. The second flexible drive member couples the second sprocket and the drive sprocket. The third flexible drive member couples the drive sprocket and the rear sprocket.

In accordance with yet another embodiment, a vehicle comprises at least one front wheel, at least one rear wheel, an engine, and a jack shaft. The engine is coupled with the rear wheel(s). A jack shaft is coupled with the engine and with the front wheel(s). The jack shaft is configured to selectively couple the engine with the front wheel(s).

BRIEF DESCRIPTION OF THE DRAWINGS

It is believed that certain embodiments will be better understood from the following description taken in conjunction with the accompanying drawings in which.

DETAILED DESCRIPTION

Figure 1:
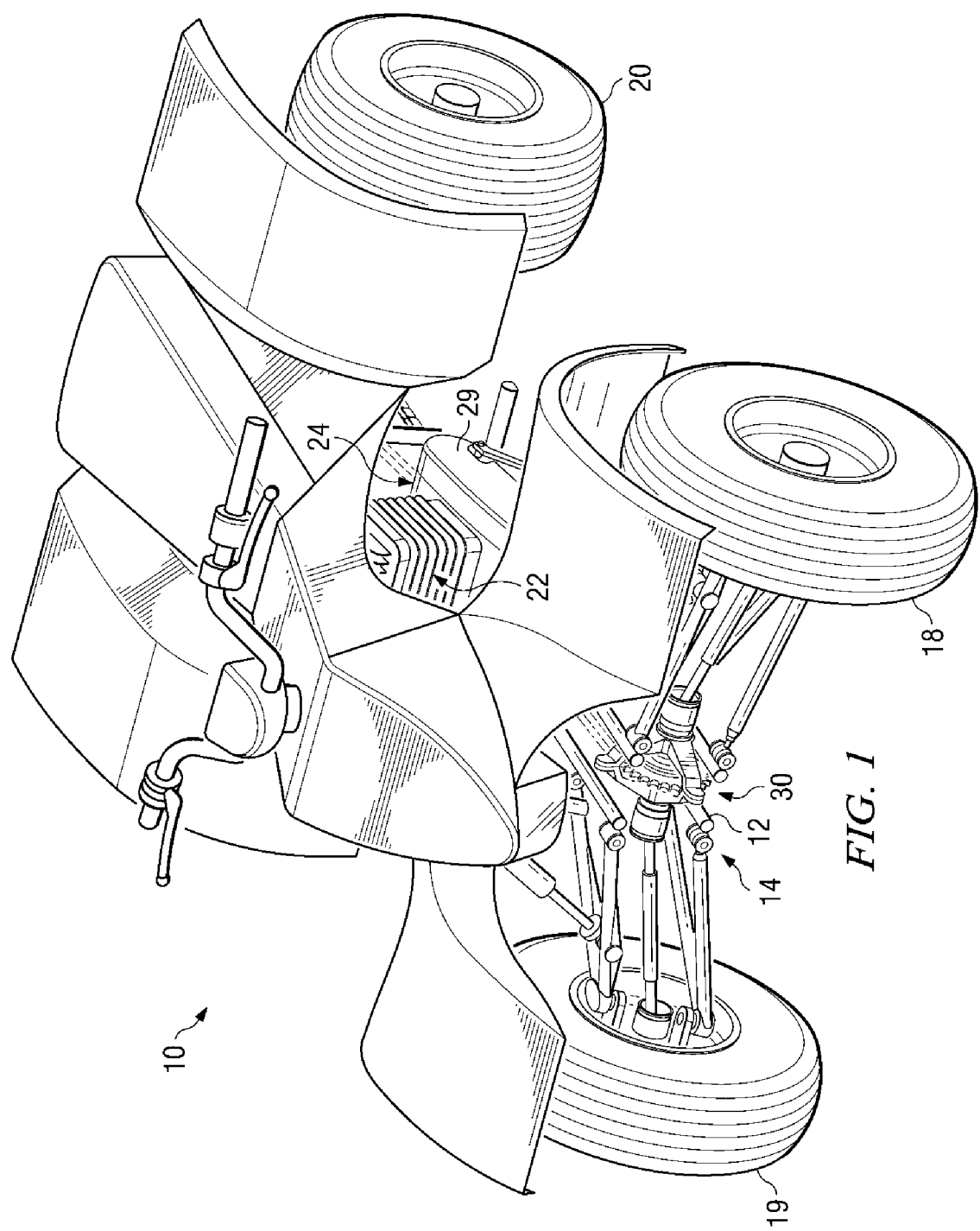
FIG. 1 is a front perspective view depicting an ATV in accordance with one embodiment.
Figure 2:
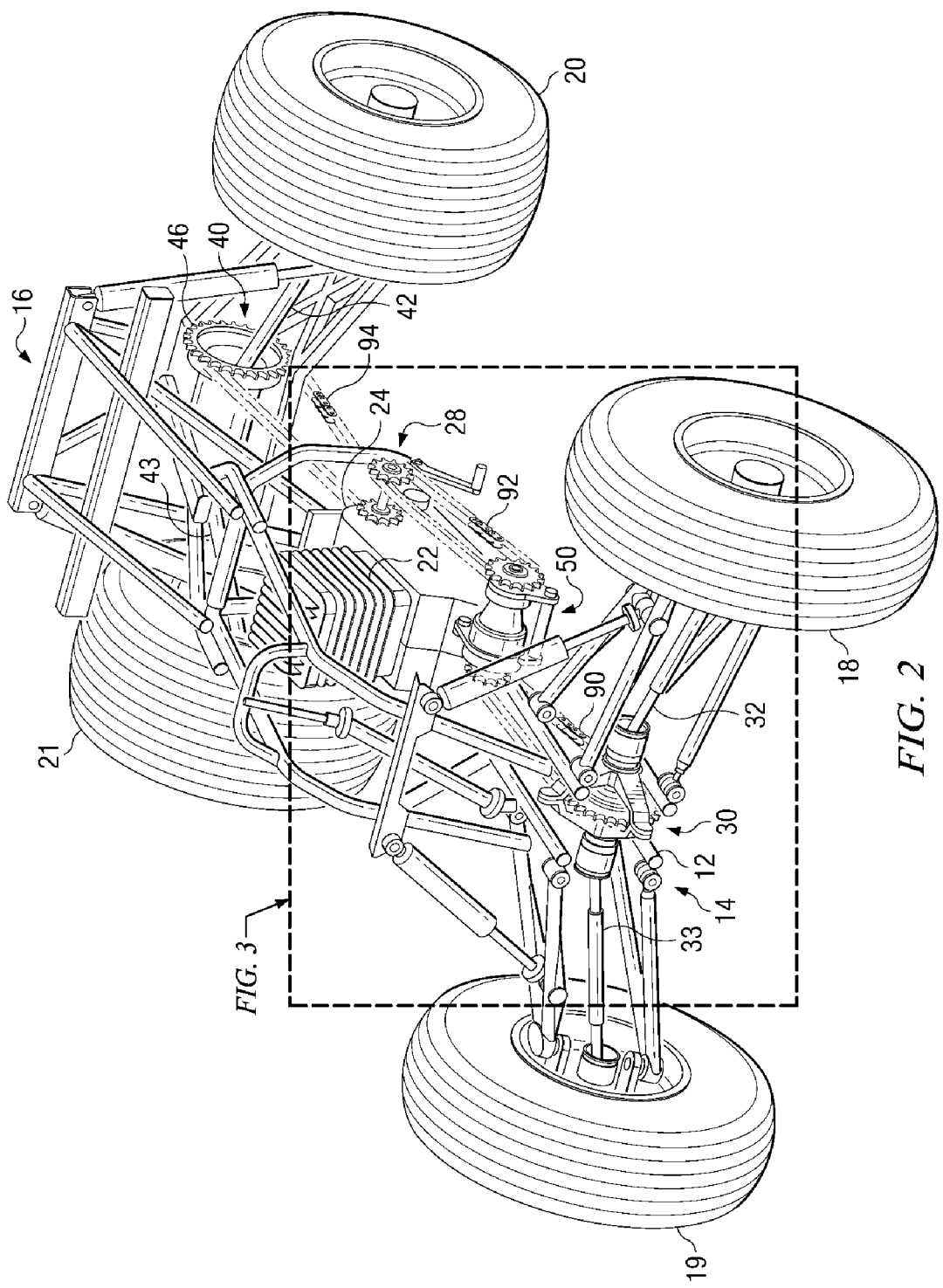
FIG. 2 is a front perspective view depicting the ATV of FIG. 1 wherein certain components of the ATV are removed for clarity of illustration.

Embodiments are hereinafter described in detail in connection with the views and examples of FIGS. 1-5, wherein like numbers indicate the same or corresponding elements throughout the views. Referring to FIGS. 1-2, an ATV 10 can include a frame 12 extending from a front end 14 to a rear end 16. At least one front wheel can be provided adjacent to a front end of a vehicle's frame, and at least one rear wheel can be provided adjacent to a rear end of a vehicle's frame. For example, a front left wheel 18 and a front right wheel 19 are each shown in FIGS. 1-2 to be supported adjacent to the front end 14 of the frame 12 of the ATV 10. Likewise, a rear left wheel 20 and a rear right wheel 21 are each shown in FIGS. 1-2 to be supported adjacent to the rear end 16 of the frame 12 of the ATV 10. It will be appreciated that one or more front and rear wheels can be associated with a vehicle's frame in any of a variety of other suitable configurations, and can be supported with respect to a frame through use of any of a variety of suspension and/or drivetrain components or configurations. Though the ATV 10 is shown to comprise four wheels (e.g., 18, 19, 20, 21), it will also be appreciated that a vehicle can comprise fewer than four wheels or more than four wheels.

Figure 3:
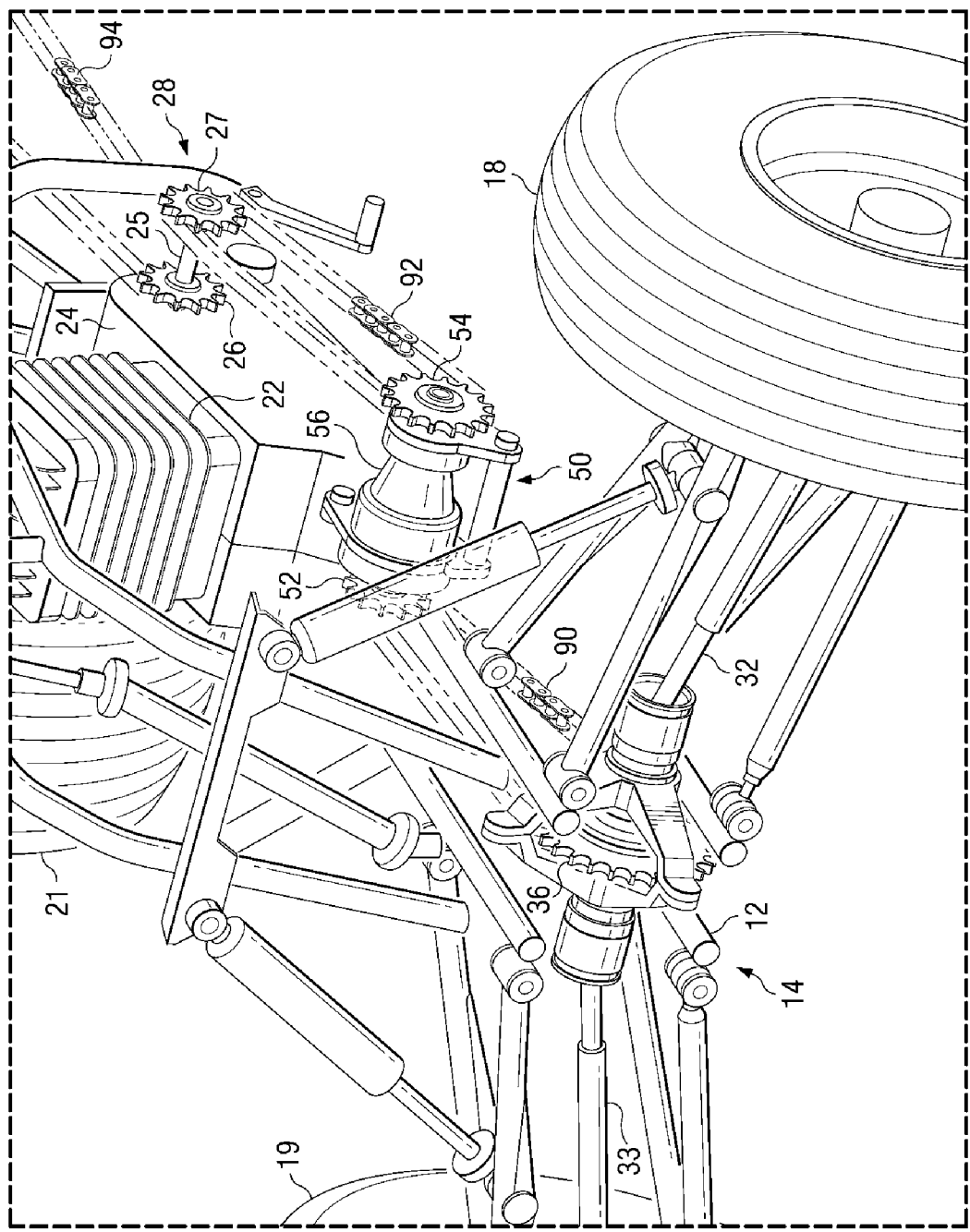
FIG. 3. is a front perspective view depicting an enlargement of a portion of FIG. 2.
Figure 4:
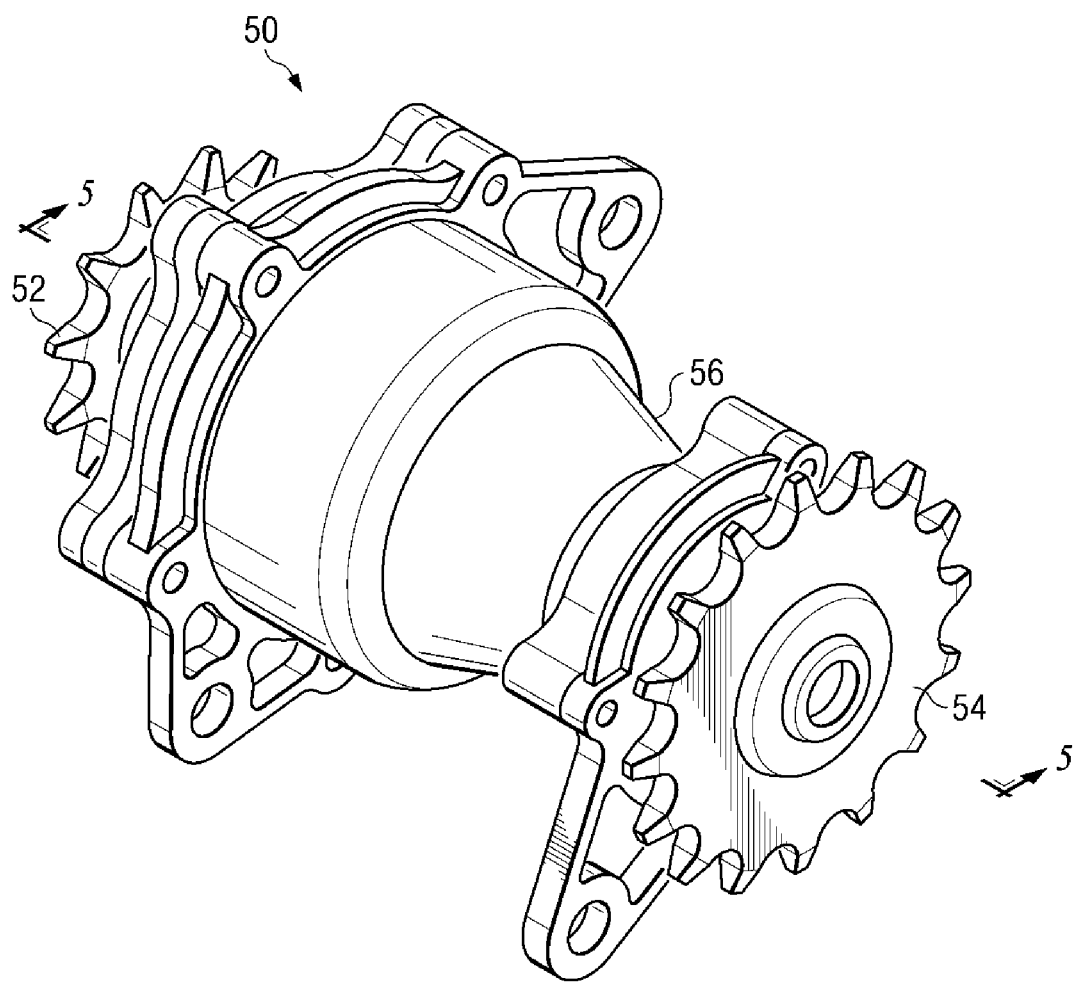
FIG. 4 is an enlarged perspective view depicting the jack shaft of FIGS. 2-3 apart from the other components of the ATV of FIGS. 2-3.

An engine 22 is shown in FIGS. 1-3 as being attached to the frame 12. It will be appreciated that this attachment can be direct or indirect, and can involve any of a variety of fasteners, bushings, collars, mounts, and/or arrangements thereof. While the engine 22 is generally depicted to comprise an internal combustion engine, it will be appreciated that an engine might alternatively or additionally comprise an electric motor and/or some other motive source. It will be appreciated that an internal combustion engine can be configured to consume any of a variety of fuels including, for example, gasoline, diesel fuel, ethanol, kerosene, jet fuel, alcohol, natural gas, propane, and hydrogen.

Referring again to FIG. 1-3, a front differential 30 can be attached to the frame 12 and can be coupled with each of the front left wheel 18 and the front right wheel 19. In particular, a drive shaft 32 is depicted as coupling the front differential 30 with the front left wheel 18, and a drive shaft 33 is likewise depicted as coupling the front differential 30 with the front right wheel 19. It will be appreciated that a front differential might be coupled with front left and right wheels in any of a variety of other suitable arrangements which might or might not involve drive shafts. The front differential 30 is shown in FIG. 3 to comprise a front sprocket 36 which can be configured to interface a flexible drive member as described below. The front sprocket 36 is accordingly shown to be drivingly engaged with each of the front left wheel 18 and the front right wheel 19 such that rotation of the front sprocket 36 results in rotation of the front left and right wheels 18 and 19. In one embodiment, such as shown in FIGS. 1-3, the front differential 30 can have a partially exposed or open configuration (e.g., such that much of the sprocket 36 is visible and accessible, as shown in FIGS. 1-3). It will be appreciated that such an open configuration can involve less material (e.g., metal) and can accordingly enable the front differential 30 to have reduced weight as compared to a front differential having a less open configuration, thus resulting in improved performance characteristics of the ATV 10.

Referring to FIG. 2, a rear differential 40 can be attached to the frame 12 and can be coupled with each of the rear left wheel 20 and the rear right wheel 21. In particular, a drive shaft 42 is depicted as coupling the rear differential 40 with the rear left wheel 20, and a drive shaft 43 is likewise depicted as coupling the rear differential 40 with the rear right wheel 21. It will be appreciated that a rear differential might be coupled with rear left and right wheels in any of a variety of other suitable arrangements which might or might not involve drive shafts. The rear differential 40 is shown in FIG. 2 to comprise a rear sprocket 46 which can be configured to interface a flexible drive member as described below. The rear sprocket 46 is accordingly shown to be drivingly engaged with each of the rear left wheel 20 and the rear right wheel 21 such that rotation of the rear sprocket 46 results in rotation of the rear left and right wheels 20 and 21.

A drive sprocket 28 is shown in FIGS. 2-3 to be coupled with the engine 22. In particular, the drive sprocket 28 is shown to be coupled with an output shaft of the transmission 24. The transmission 24 can be coupled with the engine 22. In this configuration, the transmission 24 can couple the engine with the drive sprocket 28. It will be appreciated that the transmission 24 can comprise a manual transmission or gearbox, a clutch, a continuously variable transmission, an automatic transmission, and/or any of a variety of other devices or arrangements which can facilitate selective transmission of power from the engine 22 to one or more of the vehicle's wheels (e.g., 19, 20, 21, 22). In another embodiment, a drive sprocket might be coupled directly with the crankshaft of an engine and/or to one or more other components which are, in turn, coupled directly or indirectly with the crankshaft of an engine.

The drive sprocket 28 is shown in FIG. 3 to comprise a drive shaft 25 to which respective sprockets 26, 27 are attached for rotation together. In the embodiment depicted in FIG. 3, it can be seen that the sprockets 26, 27 can be configured for drivingly engaging respective flexible drive members (e.g., chains 94, 92). In an alternative embodiment, a drive sprocket might be configured to drivingly engage only a single flexible drive member or, alternatively, to drivingly engage more than two flexible drive members. A cover 29 is shown in FIG. 1 as being configured for attachment to the engine 22 and/or transmission 24 for at least partially concealing the drive sprocket 28 and/or portions of the flexible drive members (e.g., chains 92, 94) attached thereto, and to thereby serve to prevent inadvertent contact of an operator with these components during operation of the ATV 10. While each of the flexible drive members of FIGS. 2-3 are shown to comprise chains 90, 92 and 94, it will be appreciated that a flexible drive member can alternatively comprise a V-type belt, a cogged belt, and/or any of a variety of other types of flexible drive member.

A jack shaft 50 is shown to be provided adjacent to a forward end of the engine 22. It will be appreciated that a jack shaft might be provided in any of a variety of alternative locations, and can be attached directly or indirectly to a vehicle's frame in any of a variety of suitable configurations. In the example of FIGS. 2-5, the jack shaft 50 is shown to comprise a housing 56. The housing 56 can include one or more mounting brackets to facilitate attachment of the jack shaft 50 to the frame 12 and/or engine 22 of the ATV 10.

Figure 5:
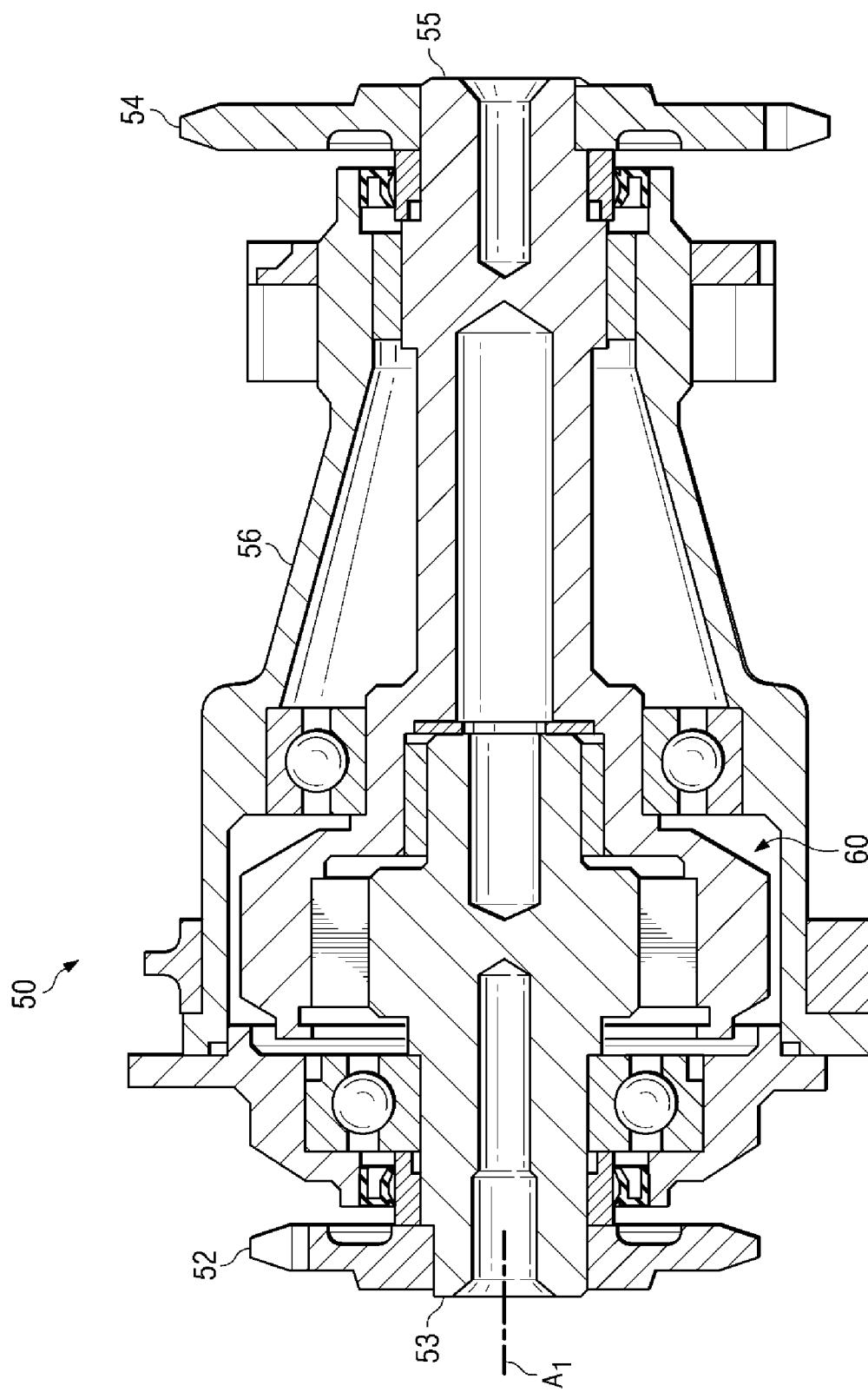
FIG. 5 is a cross-sectional view depicting the jack shaft of FIG. 4 and taken along section lines 5-5 in FIG. 4.

The jack shaft 50 can also include a first sprocket 52 and a second sprocket 54 which can be rotatable about a common axis $A_1$. In particular, the first sprocket 52 is shown to be attached to a first shaft 53 which is rotatably received and supported by the housing 56. Likewise, the second sprocket 54 is shown to be attached to a second shaft 55 which is rotatably received and supported by the housing 56. Bushings and bearings are shown in FIG. 5 to be provided within the housing to facilitate rotation of the first and second shafts 53, 55 with respect to the housing 56. In one embodiment, as shown in FIG. 5, the housing 56 might comprise seals such that the housing 56 may contain grease, oil, or some other lubricant to facilitate substantially frictionless rotation of the first and second shafts 53, 55 with respect to the housing 56.

The jack shaft 50 can further comprise a one-way clutch such as that which is generally depicted at location 60 in FIG. 5. The one-way clutch 60 can facilitate selective rotational coupling of the first and second shafts 53, 55, and can accordingly couple the first sprocket 52 and the second sprocket 54. In particular, the one-way clutch 60 can facilitate transfer of power from the second sprocket 54 to the first sprocket 52 (e.g., during forward motion of the ATV 10 uphill), but can prevent transfer of power from the first sprocket 52 to the second sprocket 54 (e.g., during forward motion of the ATV 10 downhill). The one-way clutch 60 can comprise a sprag-type clutch (sometimes called a "sprague-type clutch") or a roller-type clutch, for example. However, it will be appreciated that the one-way clutch 60 can have any of a variety of other suitable one-way, overrunning, or freewheeling type clutch configurations.

Referring to FIG. 3, a first flexible drive member (e.g., chain 90) can be provided to couple the front sprocket 36 and the first sprocket 52 of the jack shaft 50. A second flexible drive member (e.g., chain 92) can be provided to couple the second sprocket 54 and the sprocket 27 of the drive sprocket 28. A third flexible drive member (e.g., chain 94) can be provided to couple the sprocket 26 of the drive sprocket 28 with the rear sprocket 46. In the embodiment of FIGS. 2-3, the chains 90, 92, the jack shaft 50, and the front differential 30 cooperate to facilitate coupling of the drive sprocket 28, and thus the engine 22, with the front left and right wheels 18, 19. In this same embodiment, the chain 94 and the rear differential 40 cooperate to facilitate coupling of the drive sprocket 28, and thus the engine 22, with the rear left and right wheels 20, 21. While the sprockets 26, 27, the front sprocket 36, the rear sprocket 46, the first sprocket 52, and the second sprocket 54 are each depicted as being suitable to drivingly interface a chain (e.g., 90, 92, or 94), it will be appreciated that these components might alternatively be configured to drivingly interface a V-type belt, a cogged belt, or any of a variety of other types of flexible drive member. While the ATV 10 is shown to comprise three flexible drive members (e.g., chains 90, 92, 94) for coupling the engine 22 with the ATV's wheels (e.g., 18, 19, 20, 21), it will be appreciated that a vehicle might alternatively include fewer than three flexible drive members, or more than three flexible drive members. For example, in one alternative embodiment (not shown) involving a vehicle having only two flexible drive members, one of the flexible drive members can be routed over a drive sprocket, a rear sprocket, and a second sprocket of a jack shaft, while the other of the flexible drive members can be routed over a front sprocket and a first sprocket of the jack shaft.

The jack shaft 50 is shown in FIG. 2 to facilitate a lateral offset in the position of respective flexible drive members (e.g., chains 90, 92, 94) which couple the engine 22 with the front and rear differentials 30, 40. In particular, the drive sprocket 28 and the rear sprocket 46 are both shown to be located left of center on the ATV 10. The second sprocket 54 of the jack shaft 50 is also shown to be located left of center on the ATV 10, and the chains 92 and 94 are shown to be located left of center on the ATV 10 to facilitate coupling of the drive sprocket 28 with the second sprocket 54 and the rear sprocket 46. However, the front sprocket 36 and the first sprocket 52 of the jack shaft 50 are both shown to be located near the center of the ATV 10, and to be coupled by the chain 90. It will be appreciated that this arrangement enables positioning the front sprocket 36 of the front differential 30 near the center (from left to right) of the ATV 10, as shown in FIGS. 1-3, which accordingly maximizes the available suspension stroke for each of the front left and right wheels 18, 19 of the ATV 10.

The one-way clutch 60 in the jack shaft 50 of the ATV 10 enables the front wheels 18, 19 of the ATV 10 to selectively overrun the rear wheels 20, 21 during certain driving conditions. Furthermore, by providing the one-way clutch 60 in the jack shaft 50 of the ATV 10 as described above, it will be appreciated that additional one-way clutches might not be provided in the hubs of the individual front left and right wheels 18, 19. These wheel hubs can accordingly be simplified as compared to conventional wheel hubs which include one-way clutches. In simplifying the front wheel hubs, the weight of the front wheel hubs can be reduced, thus reducing the unsprung weight of the front suspension components of the ATV 10, and accordingly improving performance characteristics of the ATV 10. In addition, it will be appreciated that providing and servicing a single one-way clutch provided in a jack shaft can be simpler and less time consuming than providing and servicing multiple one-way clutches provided within respective front wheel hubs. In an alternative embodiment, one-way clutches might be provided in both the jack shaft 50 as well as within the hubs of one or more of the wheels (e.g., 18, 19, 20, 21) of the ATV 10.

While FIGS. 1-3 disclose an ATV 10, it will be appreciated that the features described herein can be provided upon any of a variety of other types of vehicles such as, for example, automobile, trucks, vans, scooters, recreational vehicles, aircraft, agricultural equipment, construction equipment, toys, and mowers.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
a frame extending from a front end to a rear end;
at least one front wheel supported adjacent to the front end of the frame;
at least one rear wheel supported adjacent to the rear end of the frame;
an engine attached to the frame;
a drive sprocket coupled with the engine;
a front sprocket drivingly engaged with said front wheel;
a rear sprocket drivingly engaged with said rear wheel;
a jack shaft comprising a first sprocket, a second sprocket, and a one-way clutch selectively coupling the first sprocket and the second sprocket;
a front differential; and
a plurality of drive shafts; wherein
the front sprocket is coupled with the first sprocket of the jack shaft;
the drive sprocket is coupled with each of the rear sprocket and the second sprocket of the jack shaft;
said front wheel comprises a front left wheel and a front right wheel, the front differential is coupled with each of the front left wheel and the front right wheel, and the front differential comprises the front sprocket;
a first one of the drive shafts couples the front differential and the front left wheel;
a second one of the drive shafts couples the front differential and the front right wheel; and
the front sprocket is positioned such that the front sprocket is nearly laterally centered on the vehicle.

2. A vehicle comprising:
a frame extending from a front end to a rear end;
at least one front wheel supported adjacent to the front end of the frame;
at least one rear wheel supported adjacent to the rear end of the frame;
an engine attached to the frame;
a drive sprocket coupled with the engine;
a front sprocket drivingly engaged with said front wheel;
a rear sprocket drivingly engaged with said rear wheel; and
a jack shaft comprising a first sprocket, a second sprocket, and a one-way clutch selectively coupling the first sprocket and the second sprocket; wherein
the front sprocket is coupled with the first sprocket of the jack shaft;
the drive sprocket is coupled with each of the rear sprocket and the second sprocket of the jack shaft;
the jack shaft further comprises a housing, a first shaft and a second shaft;
the first sprocket is attached to the first shaft and the second sprocket is attached to the second shaft; and
each of the first shaft and the second shaft is rotatably received and supported by the housing.

3. An all terrain vehicle comprising:
a frame extending from a front end to a rear end;
a front left wheel and a front right wheel each being supported adjacent to the front end of the frame;
a front differential coupled with each of the front left wheel and the front right wheel, wherein the front differential comprises a front sprocket;
a rear left wheel and a rear right wheel each being supported adjacent to the rear end of the frame;
a rear differential coupled with each of the rear left wheel and the rear right wheel, wherein the rear differential comprises a rear sprocket;
an engine attached to the frame;
a transmission coupled with the engine;
a drive sprocket coupled with the transmission;

a jack shaft comprising a first sprocket, a second sprocket, and a one-way clutch selectively coupling the first sprocket and the second sprocket;
a first flexible drive member coupling the front sprocket and the first sprocket;
a second flexible drive member coupling the second sprocket and the drive sprocket; and
a third flexible drive member coupling the drive sprocket and the rear sprocket; wherein
the first sprocket and the second sprocket are rotatable about a common axis;
the jack shaft further comprises a housing, a first shaft and a second shaft;
the first sprocket is attached to the first shaft and the second sprocket is attached to the second shaft; and
each of the first shaft and the second shaft is rotatably received and supported by the housing.

4. A vehicle comprising:
at least one front wheel;
at least one rear wheel;
an engine, the engine being coupled with said rear wheel; and
a jack shaft coupled with the engine and with said front wheel, wherein the jack shaft comprises a one-way clutch to selectively couple the engine with said front wheel; wherein
the jack shaft further comprises a first sprocket, a second sprocket, a housing, a first shaft and a second shaft;
the first sprocket is attached to the first shaft and the second sprocket is attached to the second shaft; and
each of the first shaft and the second shaft is rotatably received and supported by the housing.

5. The vehicle of claim 2 further comprising:
a rear differential; and
a plurality of drive shafts; wherein
said rear wheel comprises a rear left wheel and a rear right wheel;
a first one of the drive shafts couples the rear differential and the rear left wheel; and
a second one of the drive shafts couples the rear differential and the rear right wheel.

6. The vehicle of claim 1 further comprising a first flexible drive member, a second flexible drive member, and a third flexible drive member, wherein the first flexible drive member couples the front sprocket and the first sprocket, the second flexible drive member couples the second sprocket and the drive sprocket, and the third flexible drive member couples the drive sprocket and the rear sprocket.

7. The vehicle of claim 6 wherein the first flexible drive member, the second flexible drive member, and the third flexible drive member each comprises a respective chain.

8. The vehicle of claim 1 further comprising a transmission, wherein the transmission couples the engine with the drive sprocket.

9. The vehicle of claim 1 further comprising a rear differential, wherein said rear wheel comprises a rear left wheel and a rear right wheel, the rear differential is coupled with each of the rear left wheel and the rear right wheel, and the rear differential comprises the rear sprocket.

10. The vehicle of claim 1 wherein the first sprocket and the second sprocket are rotatable about a common axis.

11. The vehicle of claim 1 wherein the one-way clutch facilitates transfer of power from the second sprocket to the first sprocket, but prevents transfer of power from the first sprocket to the second sprocket.

12. The all terrain vehicle of claim 3 wherein the first flexible drive member, the second flexible drive member, and the third flexible drive member each comprises a respective chain.

13. The all terrain vehicle of claim 3 wherein the one-way clutch facilitates transfer of power from the second sprocket to the first sprocket, but prevents transfer of power from the first sprocket to the second sprocket.

14. The vehicle of claim 4 wherein the one-way clutch selectively couples the first sprocket and the second sprocket, wherein the first sprocket is coupled with said front wheel, and wherein the second sprocket is coupled with the engine.

15. The vehicle of claim 14 wherein the first sprocket and the second sprocket are rotatable about a common axis, and wherein the one-way clutch facilitates transfer of power from the second sprocket to the first sprocket, but prevents transfer of power from the first sprocket to the second sprocket.

16. The vehicle of claim 14 further comprising a first flexible drive member, a second flexible drive member, and a third flexible drive member, wherein the first flexible drive member couples the first sprocket and said front wheel, the second flexible drive member couples the second sprocket and the engine, and the third flexible drive member couples the engine and said rear wheel.

17. The vehicle of claim 16 further comprising a front differential, wherein the front differential is coupled with said front wheel and comprises a front sprocket drivingly engaged with the first flexible drive member.

18. The vehicle of claim 16 further comprising a rear differential, wherein the rear differential is coupled with said rear wheel and comprises a rear sprocket drivingly engaged with the third flexible drive member.

19. The vehicle of claim 16 wherein the first flexible drive member, the second flexible drive member, and the third flexible drive member each comprises a respective chain.

* * * * *